United States Patent [19]

Flohr

[11] 3,813,733

[45] June 4, 1974

[54] SAFETY CABLE AND BAND

[76] Inventor: Ira Karl Flohr, Rt. 1, Box 2A, Ridgway, Colo. 81432

[22] Filed: Feb. 16, 1973

[21] Appl. No.: 332,994

[52] U.S. Cl.............. 24/81 A, 24/279, 285/81
[51] Int. Cl.... A44b 21/00, B65d 63/06, F16l 35/00
[58] Field of Search .............. 285/23, 27, 81, 253; 137/316; 24/73 CF, 81 A, 123 W, 279

[56] References Cited
UNITED STATES PATENTS

| 375,464 | 12/1887 | Thacher et al.................. 285/23 X |
| 1,015,311 | 1/1912 | Gold.................................. 285/253 |
| 1,186,901 | 6/1916 | Higgins............................... 24/279 |
| 2,573,203 | 10/1951 | Kinney.......................... 24/279 UX |
| 2,617,667 | 11/1952 | Stout et al..................... 285/27 X |
| 2,814,507 | 11/1957 | Lattimore......................... 285/23 |
| 2,899,733 | 8/1959 | Sundberg.......................... 24/279 |
| 3,249,370 | 5/1966 | Brogden............................. 285/81 |
| 3,416,197 | 12/1968 | Mark................................. 24/123 W |
| 3,527,487 | 9/1970 | Payne......................... 24/123 W X |
| 3,657,774 | 4/1972 | Reynolds......................... 24/73 CF |

Primary Examiner—Donald A. Griffin
Attorney, Agent, or Firm—Wilbur A. E. Mitchell

[57] ABSTRACT

A safety cable clamp for securing hose ends to an adjoining metal coupling sleeve, such as that found on a variety of machinery where high pressure air or water is pumped through a hose, comprising cylindrical bands which fit over and are secured over the hose ends at opposite sides of the hose coupling, with the bands conjoined by a braided flexible cable with closed end eyelets, one end of the cable interconnecting directly with a band, and the other end secured to a snap hook which connects the remaining band.

3 Claims, 4 Drawing Figures

PATENTED JUN 4 1974

3,813,733

SAFETY CABLE AND BAND

BACKGROUND OF THE INVENTION

This invention relates specifically to a novel safety means for coupling high pressure air, steam or water hose ends.

A principle purpose of the present invention is to provide a safety cable with diametrically adjustable bands at each of its ends for retaining a hose end by each band to a permanently mounted coupling sleeve in the event the coupling breaks loose.

OBJECTS OF THE PRESENT INVENTION

A principal object of the present invention is to provide a device for retaining hose ends together as normally conjoined by a coupling, and through which pressurized air, water or gas is normally contained, in the event the coupling comes loose.

Another object of the present invention is to provide a device for retaining a flexible cable to a sleeve or extension which is rugged in construction, simple to use, versatile in design, and relatively inexpensive to manufacture.

BRIEF DESCRIPTION OF THE DRAWING

These together with other objects will be readily apparent in the following specifications and drawings wherein.

DETAILED DESCRIPTION

Figure 1:
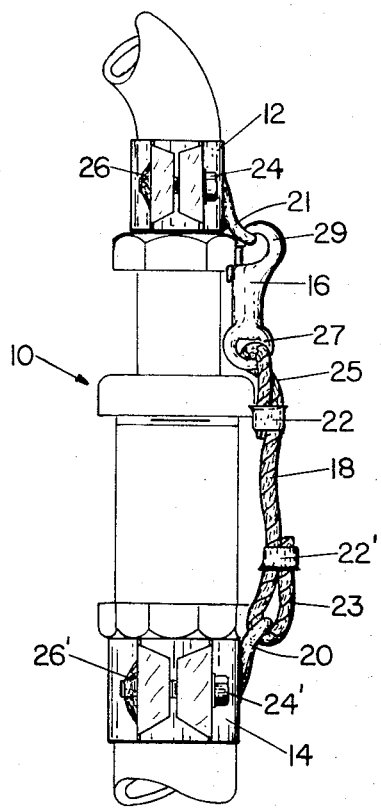
FIG. 1 is a plan view of the present invention shown in operative use.
Figure 2:
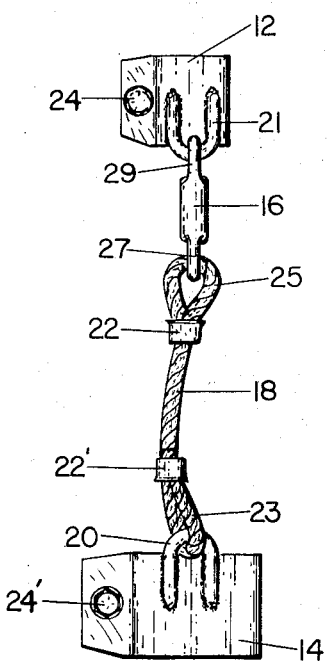
FIG. 2 is a partial side view of the present invention.
Figure 3:
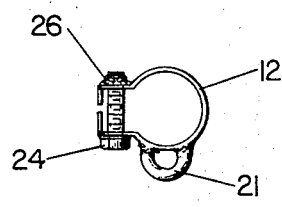
FIG. 3 is an end view of one end band and, FIG. 4 is an end view of the opposite end band.
Figure 4:
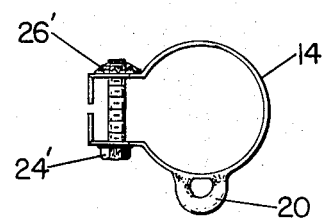

Referring now to the drawing in detail, the reference numeral 10 generally represents a metal coupling or sleeve portion of such a hose connected to the sleeve, of an air operated drill machine, wherein one form of the present invention is illustrated as secured on opposite sides of the coupling sleeve. In this embodiment, I utilize two galvanized metal bands, 12 & 14, each cylindrical in shape, differing in diameter and tapered on sides. Said bands 12 & 14 are each adjustable diametrically by conventional stud bolts 24 & 24' and nuts 26 & 26', on the tapered sides of bands 12 & 14 respectively as shown, for tightening around their respective separate end portions of the hose and sleeve 10.

I provide each of the bands 12 & 14 with a u shaped ring, 21 and 20 respectively, as shown. Then I detachably connect rings 20 and 21 by a flexible but strong cable 18. The ring 20 fixidly engaging with one loop 23 side of the braided cable 18, and the ring 23 engaging detachably with loop end 25 of cable 18. Those loops are secured by brass ferrules 22 & 22'. The end 25 of the cable 18 engages an end 27 of a snap hook 16, wherein ring 21 of band 12 detachably conjoins with opposite end 29 of the snap hook 16, as shown.

In operative use, the present invention, with bolt 24 and 24' removed, is secured to opposite sides of the coupling sleeve for joining the hose ends to the sleeve or hose to a hose, which carry pressurized air, water or steam of construction or industrial machinery. Each band, 12 & 14, is placed over an end of a hose and its sleeve portion, being secured by bolts 24 and 24' into nuts, 26 & 28. The bands 12 & 14 are conjoined by safety cable 18, by snap hook 16 being snapped onto ring 21.

It is evident that my invention will secure the hose connections, in event that the hose sleeve metal coupling 10 breaks loose.

What I now claim is:

1. In a removably connected high pressure hose-ends coupling for two hose ends, the combination comprising two metal bands, one of said bands being detachably secured to one of said hose ends and the other of said bands secured to the other of said hose ends, an assemblyable and disassemblyable male-female hose coupling sleeve means connecting said hose ends, a flexible safety cable detachably extending between and secured to said bands, and said flexible safety cable means being so detachable from the one of said bands without disassembling said coupling sleeve.

2. A high pressure hose-ends coupling combination as defined in claim 1, and characterized further by the flexible safety cable means being a braided rope means and having one of its ends permanently secured to one of said bands and the other of its ends having a disengageable securing means secured thereto for thereby detachably securing that other end to the other of said clamps without having to disassemble either of said bands.

3. In safety connecting coupler for connecting high pressure hose ends, comprising a screw-threaded rigid male-female union coupler connector sleeve means over a portion of which each hose end is inserted and secured, a removable clamp-holder band means over each of said hose ends and secured thereto for removably securing the hose ends onto the union coupler, the combination therewith of a flexible cable means secured to and extending between each of said clamp band means, and with one end of said cable means being detachably fastened onto one of said clamp bands, and with said cable means being adapted to be detached at its detachable end without a first removal of either of said clamp holder band means.

* * * * *